(12) United States Patent
Gong et al.

(10) Patent No.: US 11,320,949 B2
(45) Date of Patent: May 3, 2022

(54) TOUCH PANEL, MANUFACTURING METHOD THEREOF, TOUCH SCREEN AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Qing Gong, Beijing (CN); Chang Zhang, Beijing (CN); Jianjun Wu, Beijing (CN); Biyu Zhao, Beijing (CN); Dehua Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 496 days.

(21) Appl. No.: 16/338,844

(22) PCT Filed: Jul. 26, 2018

(86) PCT No.: PCT/CN2018/097204
§ 371 (c)(1),
(2) Date: Apr. 2, 2019

(87) PCT Pub. No.: WO2019/029376
PCT Pub. Date: Feb. 14, 2019

(65) Prior Publication Data
US 2021/0286472 A1     Sep. 16, 2021

(30) Foreign Application Priority Data

Aug. 8, 2017    (CN) .................. 201710672610.X

(51) Int. Cl.
*G06F 3/044*      (2006.01)

(52) U.S. Cl.
CPC .......... *G06F 3/0446* (2019.05); *G06F 3/0443* (2019.05); *G06F 3/0448* (2019.05);
(Continued)

(58) Field of Classification Search
CPC combination set(s) only.
See application file for complete search history.

(56) References Cited

U.S. PATENT DOCUMENTS

| | | | |
|---|---|---|---|
| 8,698,512 B2* | 4/2014 | Tao ...................... | G06F 3/0448 324/686 |
| 9,137,882 B2* | 9/2015 | Yoo .......................... | H05F 3/00 |

(Continued)

FOREIGN PATENT DOCUMENTS

| | | |
|---|---|---|
| CN | 101819483 A | 9/2010 |
| CN | 103049145 A | 4/2013 |

(Continued)

OTHER PUBLICATIONS

International Search Report and Written Opinion dated Nov. 7, 2018; PCT/CN2018/097204.

(Continued)

*Primary Examiner* — William Boddie
*Assistant Examiner* — Alecia D English

(57) ABSTRACT

A touch panel, including a touch electrode layer having a plurality of touch units arranged in a matrix, each of the touch units includes one touch driving electrode and one touch sensing electrode, a shape of the touch driving electrode is complementary with a shape of the touch sensing electrode; touch sensing electrodes of adjacent two touch units are connected, touch driving electrodes of adjacent two touch units are connected; and an edge of the touch driving electrode and an edge of the touch sensing electrode of that are complementary with each other in each of the touch units each are changed in a curved line. A manufacturing method (Continued)

of the touch panel, a touch screen and a display device are also disclosed.

20 Claims, 4 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | | |
|---|---|---|---|
| 2011/0050625 A1* | 3/2011 | Kim ...................... | G06F 3/0446 345/174 |
| 2011/0115718 A1 | 5/2011 | Hsieh et al. | |
| 2015/0268761 A1* | 9/2015 | Yang ..................... | G06F 3/0446 345/174 |
| 2016/0259447 A1 | 9/2016 | Lin et al. | |
| 2017/0344141 A1* | 11/2017 | Lee ....................... | G06F 3/0443 |

FOREIGN PATENT DOCUMENTS

| | | |
|---|---|---|
| CN | 103092417 A | 5/2013 |
| CN | 103186308 A | 7/2013 |
| CN | 106155388 A | 11/2016 |
| CN | 107301003 A | 10/2017 |

OTHER PUBLICATIONS

The First Chinese Office Action dated May 7, 2019; Appln. No. 201710672610.X.
Third Chinese Office Action Application No. 201710672610; dated Aug. 20, 2020.

* cited by examiner

TOUCH PANEL, MANUFACTURING METHOD THEREOF, TOUCH SCREEN AND DISPLAY DEVICE

The present application claims the benefits of Chinese patent application No. 201710672610.X filed with the SIPO on Aug. 8, 2017, and the contents of the above-mentioned Chinese patent application is fully incorporated herein by reference as part of this application.

TECHNICAL FIELD

Embodiments of the present disclosure relate to a touch panel, manufacturing method thereof, a touch screen and a display device.

BACKGROUND

With the rapid development of display technologies, touch screen has been gradually pervaded throughout peoples' daily lives. Correspondingly, the market scale of touch screens is bigger and bigger. In order to enhance the competitive strength, with the goal of simplifying the production process, reducing the production cost and improving the performance, manufacturers of touch panels continuously raise the technical level of production.

SUMMARY

At least one embodiment of the present disclosure provides a touch panel including a touch electrode layer having a plurality of touch units arranged in a matrix; each of the touch units includes one touch driving electrode and one touch sensing electrode, a shape of the touch driving electrode is complementary with a shape of the touch sensing electrode; touch sensing electrodes of adjacent two touch units are connected, touch driving electrodes of adjacent two touch units are connected; and an edge of the touch driving electrode and an edge of the touch sensing electrode in each of the touch units that are complementary with each other each are changed in a curved line.

In an embodiment of the present disclosure, the number of fluctuant change of the curved line is greater than 1; and the number of curvature change of the curved line is greater than or equal to 1.

In an embodiment of the present disclosure, the curvature change of the curved line is in the range from 90° to 180°.

In an embodiment of the present disclosure, each of the touch driving electrodes includes two driving sub-electrodes disposed in axial symmetry; the two driving sub-electrodes are connected through at least one connecting bridge.

In an embodiment of the present disclosure, each of the touch sensing electrodes includes two sensing sub-electrodes disposed in axial symmetry; the two sensing sub-electrodes are connected through at least one connecting bridge.

In an embodiment of the present disclosure, each of the touch units includes four connecting bridges; the two driving sub-electrodes are connected through two connecting bridges, and the two connecting bridges are disposed in axial symmetry along a column direction; and the two sensing sub-electrodes are connected through two connecting bridges, and the two connecting bridges are disposed in axial symmetry along a row direction.

In an embodiment of the present disclosure, the touch unit further includes two floating sub-electrodes disposed in axial symmetry; the floating sub-electrode is located at an edge of the driving sub-electrode and an edge of the sensing sub-electrode which are complementary with each other, and the floating sub-electrode is insulated from the driving sub-electrode and the sensing sub-electrode.

In an embodiment of the present disclosure, each of the touch driving electrodes includes two driving sub-electrodes disposed in point symmetry; the two driving sub-electrodes are connected through at least one connecting bridge.

In an embodiment of the present disclosure, each of the touch sensing electrodes includes two sensing sub-electrodes disposed in point symmetry; the two sensing sub-electrodes are connected through at least one connecting bridge.

In an embodiment of the present disclosure, each of the touch units includes four connecting bridges; the two driving sub-electrodes are connected through two connecting bridges, and the two connecting bridges are disposed in point symmetry; and the two sensing sub-electrodes are connected through two connecting bridges, and the two connecting bridges are disposed in point symmetry.

In an embodiment of the present disclosure, the touch unit further includes two floating sub-electrodes disposed in point symmetry; the floating sub-electrode is located at an edge of the driving sub-electrode and an edge of the sensing sub-electrode which are complementary with each other, and the floating sub-electrode is insulated from the driving sub-electrode and the sensing sub-electrode.

In an embodiment of the present disclosure, the connecting bridges are uniformly arranged in the touch unit.

At least one embodiment of the present disclosure provides a touch screen including the touch panel described above.

At least one embodiment of the present disclosure provides a display device including the touch screen described above.

At least one embodiment of the present disclosure provides a manufacturing method of the touch panel described above, including forming a touch electrode layer on a base substrate; the touch electrode layer has a plurality of touch units arranged in a matrix; each of the touch units includes one touch driving electrode and one touch sensing electrode, a shape of the touch driving electrode is complementary with a shape of the touch sensing electrode; touch sensing electrodes of adjacent two touch units are connected, touch driving electrodes of adjacent two touch units are connected; and an edge of the touch driving electrode and an edge of the touch sensing electrode of each of the touch units that are complementary with each other each are changed in a curved line.

In an embodiment of the present disclosure, forming a touch electrode layer on a base substrate includes: forming a plurality of touch driving electrodes and a plurality of touch sensing electrodes on the base substrate, in which each of the touch driving electrodes includes two driving sub-electrodes disposed in axial symmetry and each of the touch sensing electrodes includes two sensing sub-electrodes disposed in axial symmetry, or, each of the touch driving electrodes includes two driving sub-electrodes disposed in point symmetry and each of the touch sensing electrodes includes two sensing sub-electrodes disposed in point symmetry; and forming a plurality of connecting bridges on the base substrate having been formed with the touch driving electrodes and the touch sensing electrodes, in which each of the connecting bridges is configured to connect the two driving sub-electrodes disposed in symmetry with each other or connect the two sensing sub-electrodes disposed in symmetry with each other in each of the touch units.

In an embodiment of the present disclosure, the manufacturing method further includes forming a plurality of floating electrodes on the base substrate having been formed with the plurality of touch driving electrodes and the plurality of touch sensing electrodes, in which each of the floating electrodes includes two floating sub-electrodes disposed in axial symmetry or in point symmetry, the floating sub-electrode is located at an edge of the driving sub-electrode and an edge of the sensing sub-electrode which are complementary with each other, and the floating sub-electrode is insulated from the driving sub-electrode and the sensing sub-electrode.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. Apparently, the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

In the field of touch display, the touch screen may be arranged in various ways, including touch structures such as One Glass Solution (OGS), On Cell and In Cell, in which On Cell structure is extremely popular for its advantages of high touch precision and convenience to be manufactured in Organic Light-Emitting Display (OLED) screens. Currently, the On Cell technology is mainly divided into panel manufacturing technology in a single-layered structure and panel manufacturing technology in a multi-layered structure. The panel manufacturing technology in a multi-layered structure provides a touch precision higher than that of the panel manufacturing technology in a multi-layered structure, can support true multi-touch, and has a better shadow elimination effect than that of the panel manufacturing technology in a single-layered structure. Therefore, the panel manufacturing technology in a multi-layered structure is widely applied in OLED screen technology.

In the field of hand-held display such as mobile phone and tablet PC, the touch display is wholly developed towards the direction of low profile. With the continuous decrease of the thickness of film layers in the laminated structure of the touch panel, the distance between the touch sensing layer and the display layer is smaller and smaller, which results in continuous increase of noise generated in touch and control, continuous decrease of the amount of touch signal, and continuous reduction of touch precision.

Figure 1A:
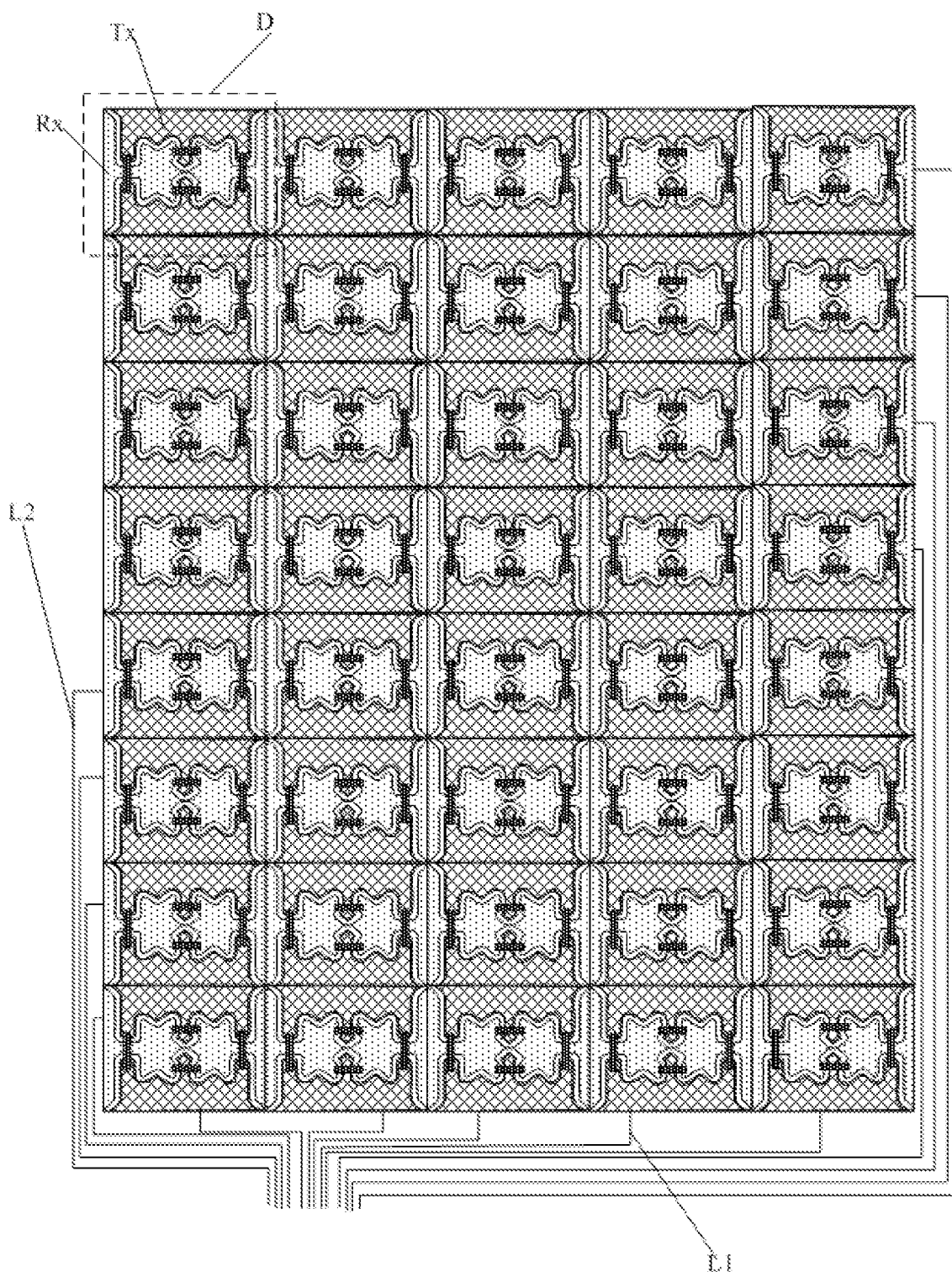
FIG. 1A and FIG. 1B are structural diagrams of a touch panel according to an embodiment of the present disclosure.
Figure 1B:
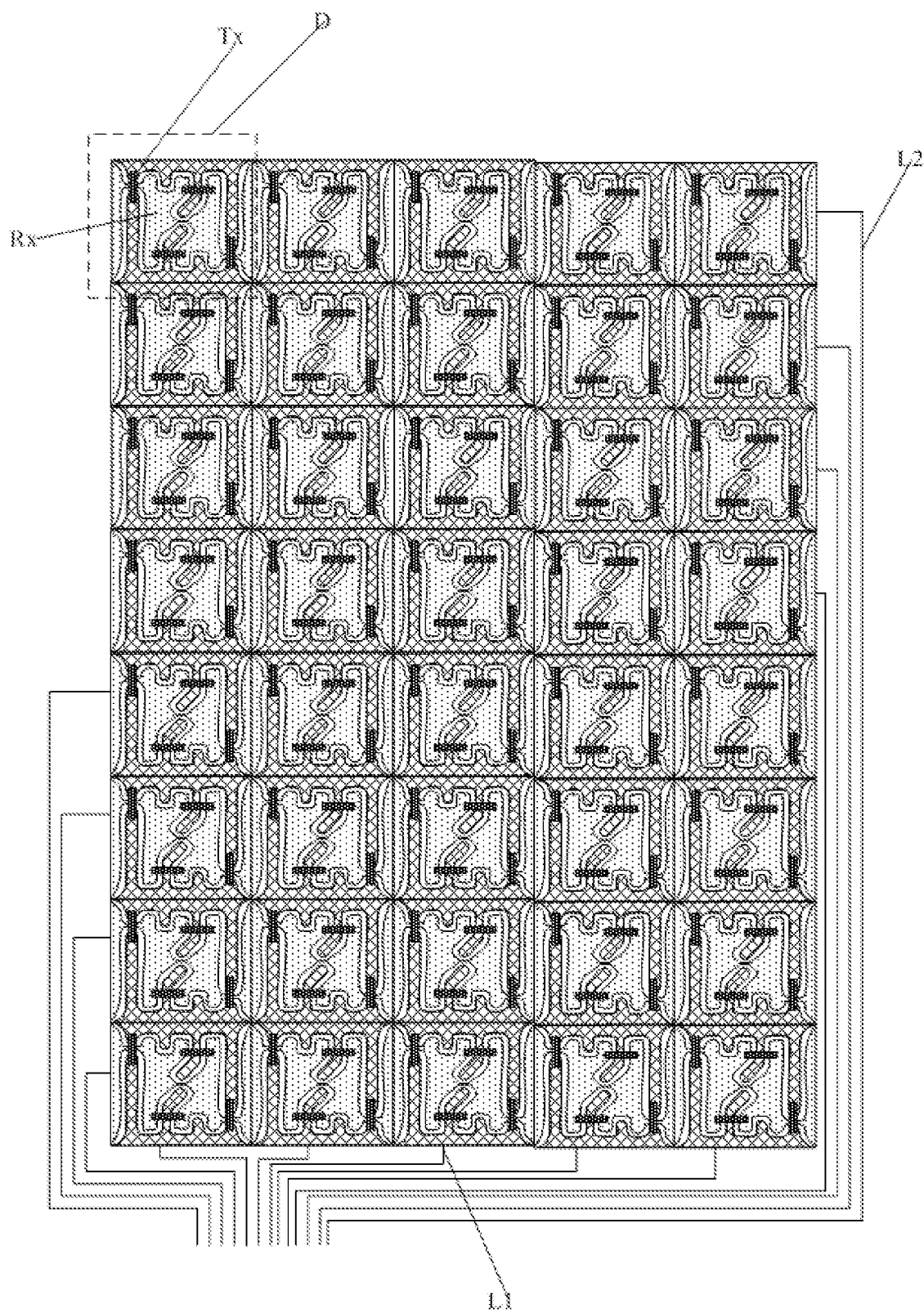

At least one embodiment of the present disclosure provides a touch panel. As illustrated in FIG. 1A and FIG. 1B, the touch panel includes a touch electrode layer having a plurality of touch units D arranged in a matrix.

Each of the touch units D includes one touch driving electrode Tx and one touch sensing electrode Rx, and a shape of the touch driving electrode Tx is complementary with a shape of the touch sensing electrode Rx; the touch sensing electrodes Rx of adjacent two touch units D are connected; the touch driving electrodes Tx of adjacent two touch units D are connected; an edge of the touch driving electrode Tx and an edge of the touch sensing electrode Rx that are complementary with each other in each of the touch units D each are changed in a curved line.

In the touch panel according to the embodiment of the present disclosure described above, by designing the edge of the touch driving electrode and the edge of the touch sensing electrode that are complementary with each other as edges changed in a curved line, an interaction area between the touch driving electrode and the touch sensing electrode can be increased, so as to increase the amount of touch sensing signal and improve the touch sensitivity. Furthermore, the design of the edge changed in a curved line allows the edge of the touch driving electrode and the edge of the touch sensing electrode to have a circular arc-shaped chamfer, and hence to reduce charge accumulation in the electrodes and improve the uniformity of the touch performance.

Figure 2A:
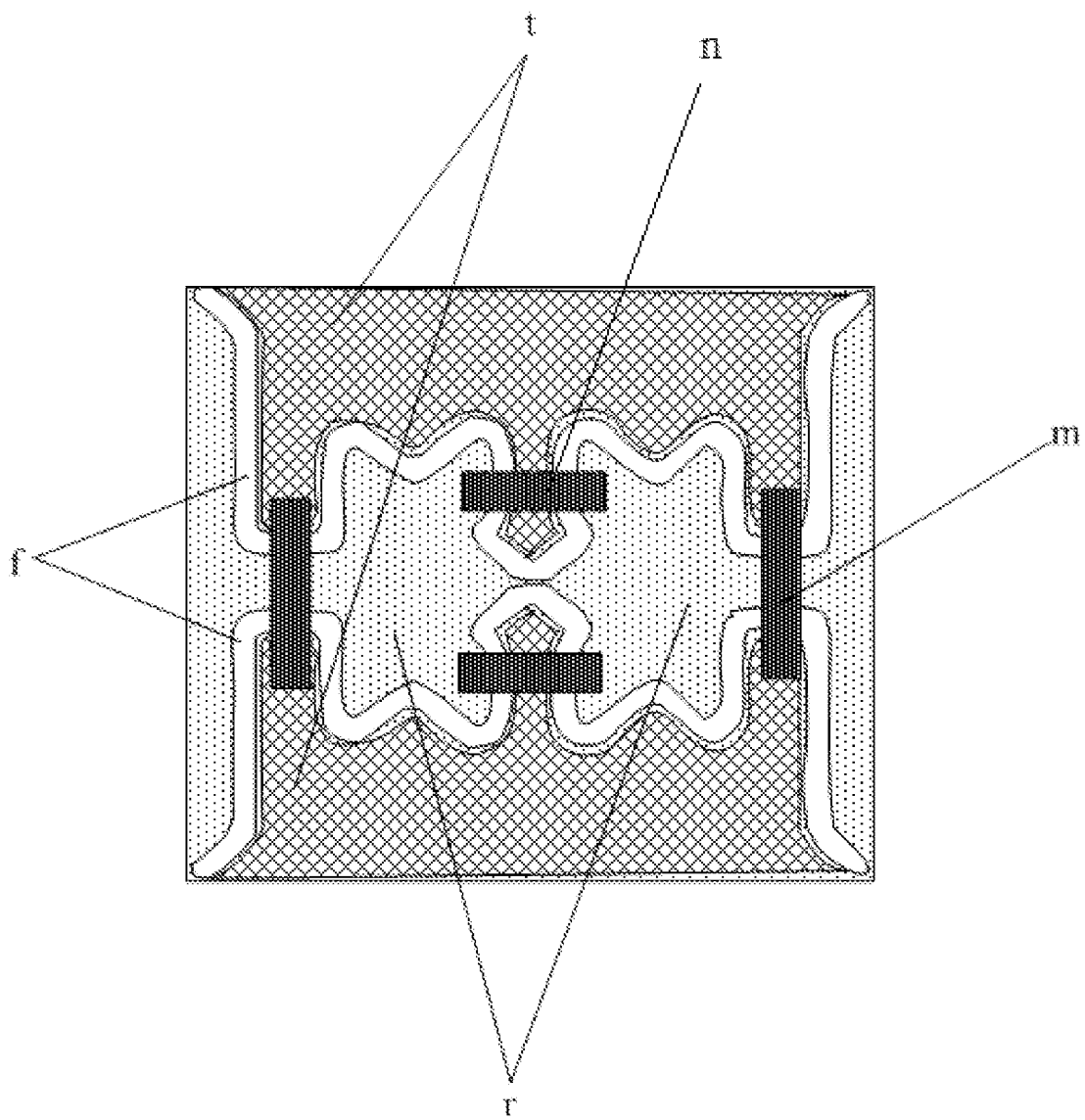
FIG. 2A and FIG. 2B are structural diagrams of a touch unit according to an embodiment of the present disclosure.
Figure 2B:
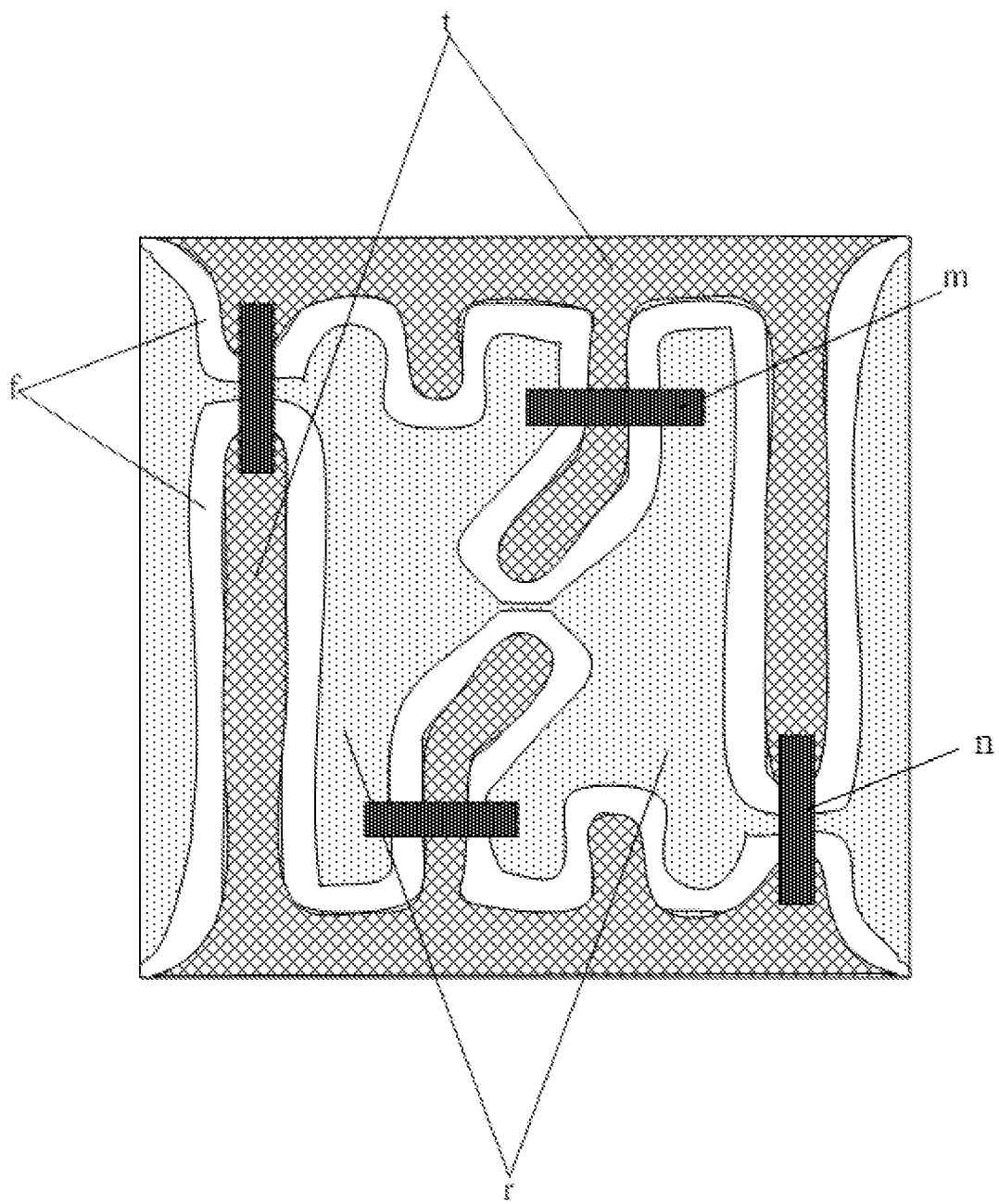

For example, as illustrated in FIG. 2A and FIG. 2B, in the touch panel according to the embodiment of the present disclosure described above, the number of fluctuant change of the curved line of the edge of the touch driving electrode and the edge of the touch sensing electrode complementary with each other may be greater than 1, and the number of curvature change of the curved line may be greater than or equal to 1. The so-called "curvature change of the curved line" refers to the change in curvature of the curved line, and the so-called "the number of curvature change of the curved line may be greater than or equal to 1" refers to that the number of the change in curvature of the curved line is greater than or equal to 1. For example, in an embodiment of the present disclosure, in order to increase the interaction area between the touch driving electrode and the touch sensing electrode and hence to improve the amount of touch sensing signal and the touch sensitivity, the edge of the touch driving electrode and the edge of the touch sensing electrode that are complementary with each other each are configured as a curved line. The curved line as illustrated in FIG. 2A and FIG. 2B may have a plurality of fluctuant changes of raising up and descending down, thus the curved edge may be extending in a shape of wavy line and has a plurality of peaks and troughs; moreover, the curved degree of the curved line, that is, the radian of the peak and the trough may be different, so that the curved line has a plurality of different curvatures and is formed with a plurality of chamfers of different radians; in this way, it further reduces the charge ambulation in the electrodes and improve the uniformity of touch performance. The curvature change of the curved line may be in the range of 90°-180°. The so-called "the curvature change of the curved line may be in the range of 90°-180°" means that the change of the curvature of the curved line may be ranged from 0 to infinity.

For example, as illustrated in FIG. 2A, in the touch panel according to the embodiment of the present disclosure described above, each of the touch driving electrodes Tx includes two driving sub-electrodes t disposed in axial symmetry; the two driving sub-electrodes t are connected through at least one first connecting bridge m; each of the touch sensing electrodes Rx includes two sensing sub-electrodes r disposed in axial symmetry; the two sensing sub-electrodes r are connected through at least one second connecting bridge n; the touch unit D further includes two floating sub-electrodes f disposed in axial symmetry; the floating sub-electrode f is located between the driving sub-electrode t and the sensing sub-electrode r, and is insulated from the driving sub-electrode t and the sensing sub-electrode r; and a shape of the floating sub-electrode f facing the driving sub-electrode t is complementary with a shape of the driving sub-electrode t, and a shape of the floating sub-electrode f facing the sensing sub-electrode r is complementary with a shape of the sensing sub-electrode r.

For example, in the touch panel according to the embodiment of the present disclosure described above, the touch unit may include two driving sub-electrodes disposed in axial symmetry, two sensing sub-electrodes disposed in axial symmetry, and two floating sub-electrodes; an edge of the driving sub-electrode and an edge of the sensing sub-electrode that are complementary with each other are separated from each other by the floating sub-electrode; in this way, by means of the floating sub-electrode, a capacitance between the touch driving electrode and the touch sensing electrode can be increased, that is, the touch sensitivity can be improved. As illustrated in FIG. 2A, the two driving sub-electrodes are connected through two first connecting bridges m, and the two connecting bridges m are disposed in axial symmetry along a column direction; the two sensing sub-electrodes are connected through two second connecting bridges n, and the two connecting bridges n are disposed in axial symmetry along a row direction; the two first connecting bridges m and the two second connecting bridges n are uniformly arranged in the touch unit, so as to effectively improve the shadow elimination effect. It should be explained that, a size of the first connecting bridge m and a size of the second connecting bridge n may be arranged as small as possible, so as to prevent from influencing the touch display; as a result, the first connecting bridge m usually is disposed at a position where the two driving sub-electrodes t are close to each other, and the second connecting bridge n usually is disposed at a position where the two sensing sub-electrodes r are close to each other. For example, the first connecting bridge m is disposed at a position where the two driving sub-electrodes t are closest to each other and a connecting bridge may be disposed, and the second connecting bridge n is disposed at a position where the two sensing sub-electrodes r are closest to each other and a connecting bridge may be disposed, as illustrated in FIG. 2A.

For example, as illustrated in FIG. 2B, in the touch panel according to the embodiment of the present disclosure described above, each of the touch driving electrodes Tx includes two driving sub-electrodes t disposed in point symmetry; the two driving sub-electrodes t are connected through at least one first connecting bridge m; each of the touch sensing electrodes Rx includes two sensing sub-electrodes r disposed in point symmetry; the two sensing sub-electrodes r are connected through at least one second connecting bridge n; the touch unit further includes two floating sub-electrodes f disposed in point symmetry; the floating sub-electrode f is located between the driving sub-electrode t and the sensing sub-electrode r, and is insulated from the driving sub-electrode t and the sensing sub-electrode r; and a shape of the floating sub-electrode facing the driving sub-electrode is complementary with a shape of the driving sub-electrode, and a shape of the floating sub-electrode facing the sensing sub-electrode is complementary with a shape of the sensing sub-electrode.

For example, in the touch panel according to the embodiment of the present disclosure described above, the touch unit may include two driving sub-electrodes disposed in point symmetry, two sensing sub-electrodes disposed in point symmetry, and two floating sub-electrodes; an edge of the driving sub-electrode and an edge of the sensing sub-electrode that are complementary with each other are separated from each other by the floating sub-electrode; in this way, by means of the floating sub-electrode, a capacitance between the touch driving electrode and the touch sensing electrode can be increased, that is, the touch sensitivity can be improved. As illustrated in FIG. 2B, the two driving sub-electrodes t are connected through two first connecting bridges m, and the two connecting bridges m are disposed in point symmetry; the two sensing sub-electrodes r are connected through two second connecting bridges n, and the two connecting bridges n are disposed in point symmetry; the two first connecting bridges m and the two second connecting bridges n are uniformly arranged in the touch unit, so as to effectively improve the shadow elimination effect. It should be explained that, a size of the first connecting bridge m and a size of the second connecting bridge n may be arranged as small as possible, so as to prevent from influencing the touch display; as a result, the first connecting bridge m usually is disposed at a position where the two driving sub-electrodes t are close to each other, and the second connecting bridge n usually is disposed at a position where the two sensing sub-electrodes r are close to each other. For example, the first connecting bridge m is disposed at a position where the two driving sub-electrodes t are closest to each other and a connecting bridge may be disposed, and the second connecting bridge n is disposed at a position where the two sensing sub-electrodes r are closest to each other and a connecting bridge may be disposed, as illustrated in FIG. 2B.

For example, the pattern of touch electrode according to the embodiment of the present disclosure described above is applicable in an OLED touch screen with On Cell structure, and the touch panel includes a bridging layer, an insulating layer, a touch electrode layer (for example, the touch electrode layer according to the embodiment of the present disclosure) and a protecting layer, in which the laminated structure of various film layers and functions thereof are similar to the well-known technologies and will be omitted with detailed description. As illustrated in FIG. 1A and FIG. 1B, a driving channel L1 and a sensing channel L2 both can adopt an unilateral connection manner, and the touch driving electrode, the touch sensing electrode and the connecting bridge all can be made by using a transparent conductive material (for example, ITO and the like).

At least one embodiment of the present disclosure provides a touch screen including the touch panel described above. The working principle of the touch screen is similar to that of the touch panel, thus the implementation of the touch screen may be referred to the implementation of the touch panel without repeating the description herein.

At least one embodiment of the present disclosure provides a display device including the touch screen described above. The display device may be any product or component with display function such as mobile phone, tablet PC, television, displayer, notebook computer, digital photo frame and navigation device. Therefore, the implementation of the display device may be referred to the implementation of the touch screen without repeating the description herein.

At least one embodiment of the present disclosure provides a manufacturing method of the touch panel described above, including forming a touch electrode layer on a base substrate; the touch electrode layer has a plurality of touch units arranged in a matrix; each of the touch units includes one touch driving electrode and one touch sensing electrode, and a shape of the touch driving electrode is complementary with a shape of the touch sensing electrode; the touch sensing electrodes of adjacent two touch units are connected, the touch driving electrodes of adjacent two touch units are connected; and an edge of the touch driving electrode and an edge of the touch sensing electrode in each of the touch unit that are complementary with each other each are changed in a curved line.

In the manufacturing method according to the embodiment of the present disclosure, by designing the edge of the touch driving electrode and the edge of the touch sensing electrode that are complementary with each other as edges changed in a curved line, an interaction area between the touch driving electrode and the touch sensing electrode can be increased, so as to increase the amount of touch sensing signal and improve the touch sensitivity. Furthermore, the design of the edge changed in a curved line allows the edge of the touch driving electrode and the edge of the touch sensing electrode to have a circular arc-shaped chamfer, and hence to reduce charge accumulation in the electrodes and improve the uniformity of the touch performance.

During implementation, in the manufacturing method according to the embodiment of the present disclosure, forming a touch electrode layer on a base substrate may include: forming a plurality of touch driving electrodes and a plurality of touch sensing electrodes on the base substrate, in which each of the touch driving electrodes includes two driving sub-electrodes disposed in axial symmetry and each of the touch sensing electrodes includes two sensing sub-electrodes disposed in axial symmetry, or, each of the touch driving electrodes includes two driving sub-electrodes disposed in point symmetry and each of the touch sensing electrodes includes two sensing sub-electrodes disposed in point symmetry; and forming a plurality of connecting bridges on the base substrate having been formed with the touch driving electrodes and the touch sensing electrodes, in which each of the connecting bridges is configured to connect the two driving sub-electrodes disposed in symmetry with each other or connect the two sensing sub-electrodes disposed in symmetry with each other in each of the touch units.

During implementation, the manufacturing method according to the present disclosure may further include: forming a plurality of floating electrodes on the base substrate having been formed with the plurality of touch driving electrodes and the plurality of touch sensing electrodes, in which each of the floating electrodes includes two floating sub-electrodes disposed in axial symmetry or in point symmetry; the floating sub-electrode is located at an edge of the driving sub-electrode and an edge of the sensing sub-electrode which are complementary with each other, and the floating sub-electrode is insulated from the driving sub-electrode and the sensing sub-electrode.

In an embodiment of the present disclosure, the floating sub-electrode is located between the touch driving electrode and the touch sensing electrode; and a shape of the floating sub-electrode facing the driving sub-electrode is complementary with a shape of the driving sub-electrode, and a shape of the floating sub-electrode facing the sensing sub-electrode is complementary with a shape of the sensing sub-electrode.

Embodiments of the present disclosure provide a touch panel, a manufacturing method thereof, a touch screen and a display device. The touch panel includes a touch electrode layer having a plurality of touch units arranged in a matrix; each of the touch units includes one touch driving electrode and one touch sensing electrode which are disposed to be complementary with each other; the touch sensing electrodes of adjacent two touch units are connected, the touch driving electrodes of adjacent two touch units are connected; an edge of the touch driving electrode and an edge of the touch sensing electrode that are complementary with each other in each of the touch units each are changed in a curved line. In this way, by designing the edge of the touch driving electrode and the edge of the touch sensing electrode that are complementary with each other as edges changed in a curved line, an interaction area between the touch driving electrode and the touch sensing electrode can be increased, so as to increase the amount of touch sensing signal and improve the touch sensitivity. Furthermore, the design of the edge changed in a curved line allows the edge of the touch driving electrode and the edge of the touch sensing electrode to have a circular arc-shaped chamfer, and hence to reduce charge accumulation in the electrodes and improve the uniformity of the touch performance.

The above are merely exemplary implementations of the present disclosure without limiting the protection scope of the present disclosure thereto. The protection scope of the present disclosure should be based on the protection scope of the appended claims.

What is claimed is:

1. A touch panel, comprising a touch electrode layer having a plurality of touch units arranged in a matrix, wherein
    each of the touch units comprises one touch driving electrode and one touch sensing electrode, a shape of the touch driving electrode is complementary with a shape of the touch sensing electrode;
    touch sensing electrodes of adjacent two touch units are connected, touch driving electrodes of adjacent two touch units are connected; and
    an edge of the touch driving electrode and an edge of the touch sensing electrode that are complementary with each other in each of the touch units each are changed in a curved line,
    wherein each of the touch driving electrodes comprises two driving sub-electrodes disposed in axial symmetry, the two driving sub-electrodes are connected through at least one connecting bridge; each of the touch sensing electrodes comprises two sensing sub-electrodes disposed in axial symmetry, the two sensing sub-electrodes are connected through at least one connecting bridge; each of the touch units comprises four connecting bridges, wherein the two driving sub-electrodes are connected through two connecting bridges, and the two connecting bridges are disposed in axial symmetry along a column direction; and the two sensing sub-electrodes are connected through two connecting bridges, and the two connecting bridges are disposed in axial symmetry along a row direction,
    or,
    wherein each of the touch driving electrodes comprises two driving sub-electrodes disposed in point symmetry, the two driving sub-electrodes are connected through at least one connecting bridge; each of the touch sensing electrodes comprises two sensing sub-electrodes disposed in point symmetry, the two sensing sub-electrodes are connected through at least one connecting bridge; each of the touch units comprises four connecting bridges, wherein the two driving sub-electrodes are connected through two connecting bridges, and the two connecting bridges are disposed in point symmetry; and the two sensing sub-electrodes are connected through two connecting bridges, and the two connecting bridges are disposed in point symmetry.

2. The touch panel according to claim 1, wherein the number of fluctuant change of the curved line is greater than 1; and the number of curvature change of the curved line is greater than or equal to 1.

3. The touch panel according to claim 2, wherein the curvature change of the curved line is in the range from 90° to 180°.

4. The touch panel according to claim 1, wherein when each of the touch driving electrodes comprises two driving sub-electrodes disposed in axial symmetry and each of the touch sensing electrodes comprises two sensing sub-electrodes disposed in axial symmetry, the touch unit further comprises two floating sub-electrodes disposed in axial symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

5. The touch panel according to claim 1, wherein when each of the touch driving electrodes comprises two driving sub-electrodes disposed in point symmetry and each of the touch sensing electrodes comprises two sensing sub-electrodes disposed in point symmetry, the touch unit further comprises two floating sub-electrodes disposed in point symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

6. The touch panel according to claim 1, wherein the connecting bridges are uniformly arranged in the touch unit.

7. A touch screen, comprising the touch panel according to claim 1.

8. A display device, comprising the touch screen according to claim 7.

9. The display device according to claim 8, wherein the number of fluctuant change of the curved line is greater than 1; and the number of curvature change of the curved line is greater than or equal to 1.

10. The display device according to claim 9, wherein the curvature change of the curved line is in the range from 90° to 180°.

11. The display device according to claim 8, wherein when each of the touch driving electrodes comprises two driving sub-electrodes disposed in axial symmetry and each of the touch sensing electrodes comprises two sensing sub-electrodes disposed in axial symmetry, the touch unit further comprises two floating sub-electrodes disposed in axial symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

12. The display device according to claim 8, wherein when each of the touch driving electrodes comprises two driving sub-electrodes disposed in point symmetry and each of the touch sensing electrodes comprises two sensing sub-electrodes disposed in point symmetry, the touch unit further comprises two floating sub-electrodes disposed in point symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

13. The display device according to claim 8, the connecting bridges are uniformly arranged in the touch unit.

14. The touch screen according to claim 7, wherein the number of fluctuant change of the curved line is greater than 1; and the number of curvature change of the curved line is greater than or equal to 1.

15. The touch screen according to claim 14, wherein the curvature change of the curved line is in the range from 90° to 180°.

16. The touch screen according to claim 7, wherein when each of the touch driving electrodes comprises two driving sub-electrodes disposed in axial symmetry and each of the touch sensing electrodes comprises two sensing sub-electrodes disposed in axial symmetry, the touch unit further comprises two floating sub-electrodes disposed in axial symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

17. The touch screen according to claim 7, wherein when each of the touch driving electrodes comprises two driving sub-electrodes disposed in point symmetry and each of the touch sensing electrodes comprises two sensing sub-electrodes disposed in point symmetry, the touch unit further comprises two floating sub-electrodes disposed in point symmetry;

the floating sub-electrode is located at an edge of the driving sub-electrode and an edge of the sensing sub-electrode which are complementary with each other, and the floating sub-electrode is insulated from the driving sub-electrode and the sensing sub-electrode.

18. The touch screen according to claim 7, the connecting bridges are uniformly arranged in the touch unit.

19. A manufacturing method of the touch panel according to claim 1, comprising:

forming a touch electrode layer on a base substrate, wherein the touch electrode layer has a plurality of touch units arranged in a matrix; each of the touch units comprises one touch driving electrode and one touch sensing electrode, a shape of the touch driving electrode is complementary with a shape of the touch sensing electrode; touch sensing electrodes of adjacent two touch units are connected, touch driving electrodes of adjacent two touch units are connected; and an edge of the touch driving electrode and an edge of the touch sensing electrode that are complementary with each other in each of the touch units each are changed in a curved line, wherein forming a touch electrode layer on a base substrate comprises:

forming a plurality of touch driving electrodes and a plurality of touch sensing electrodes on the base substrate, wherein each of the touch driving electrodes comprises two driving sub-electrodes disposed in axial symmetry and each of the touch sensing electrodes comprises two sensing sub-electrodes disposed in axial symmetry, or, each of the touch, driving electrodes comprises two driving sub-electrodes disposed in point symmetry and each of the touch sensing electrodes comprises two sensing sub-electrodes disposed in point symmetry; and forming a plurality of connecting bridges on the base substrate having been formed with the touch driving electrodes and the touch sensing electrodes, so that the two driving sub-electrodes disposed in axial symmetry are connected through two connecting bridges disposed in axial symmetry along a column direction, the two sensing sub-electrodes disposed in axial symmetry are connected through two connecting bridges disposed in axial symmetry along a row direction, the two driving sub-electrodes disposed in point symmetry are connected through two connecting bridges disposed in point symmetry, and the two sensing sub-electrodes disposed in point symmetry are connected through two connecting bridges disposed in point symmetry.

20. The manufacturing method according to claim 19, further comprising:

forming a plurality of floating electrodes on the base substrate having been formed with the plurality of touch driving electrodes and the plurality of touch sensing electrodes, wherein each of the floating electrodes comprises two floating sub-electrodes disposed in axial symmetry or in point symmetry, the floating sub-electrode is located at an edge of the driving sub-electrode and an edge of the sensing sub-electrode which are complementary with each other, and the floating sub-electrode is insulated from the driving sub-electrode and the sensing sub-electrode.

\* \* \* \* \*